United States Patent [19]
Berget et al.

[11] Patent Number: 5,518,015
[45] Date of Patent: May 21, 1996

[54] AUTOMATIC CALIBRATING ELECTRICALLY CONTROLLED DIAPHRAGM VALVE ACTUATORS AND METHODS FOR THEIR CALIBRATION

[75] Inventors: Mark D. Berget, Onalaska; Dennis L. Manthei, West Salem, both of Wis.

[73] Assignee: Gas Research Institute, Chicago, Ill.

[21] Appl. No.: 315,710

[22] Filed: Sep. 30, 1994

[51] Int. Cl.⁶ .................................................. F16K 31/04
[52] U.S. Cl. .................. 137/1; 137/554; 251/129.04; 251/129.12; 251/331
[58] Field of Search .................. 137/1, 554; 251/129.11, 251/129.12, 129.04, 331; 73/168

[56] References Cited

U.S. PATENT DOCUMENTS

| | | | |
|---|---|---|---|
| 3,488,030 | 1/1970 | Hulme et al. | 251/129.12 |
| 3,633,615 | 1/1972 | Rhodes, Jr. | 137/554 |
| 3,789,875 | 2/1974 | McGee | 137/553 |
| 3,839,662 | 10/1974 | N'Guyen Van | 251/129.12 X |
| 3,859,619 | 1/1975 | Ishihara et al. | 340/238 |
| 4,694,390 | 9/1987 | Lee | 364/165 |
| 4,789,001 | 12/1988 | Backe et al. | 137/554 |
| 4,957,274 | 9/1990 | Hood et al. | 251/129.12 |
| 5,137,257 | 8/1992 | Tice | 251/129.12 X |
| 5,193,568 | 3/1993 | Eissenberg et al. | 137/1 |
| 5,236,011 | 8/1993 | Casada et al. | 137/554 |
| 5,244,002 | 9/1993 | Frederick | 137/1 |
| 5,291,919 | 3/1994 | Calzavara | 251/129.12 X |
| 5,318,272 | 6/1994 | Smith | 251/129.12 |

Primary Examiner—John Rivell
Attorney, Agent, or Firm—Hopkins & Thomas; Scott A. Horstemeyer

[57] ABSTRACT

An automatically-calibrating electrically-controlled diaphragm valve actuator has a stepper motor controlled by a controller mechanism for moving the actuator within a diaphragm valve. A reference position indicator is provided to signal the controller mechanism when the valve actuator is at a reference position within the actuator's linear stroke. A method for automatically calibrating an electrically controlled diaphragm valve actuator includes the following steps. The actuator is initially driven to a reference position. Second, the actuator is driven a first number of steps. Third, the actuator is returned to the reference position. Fourth, it is determined whether fall back has occurred. Fifth, a second number of steps is determined based upon whether fall back has occurred. Sixth, the actuator is driven the second number of steps in order to compensate for the fall back. Finally, the third through sixth steps are repeated until the number of motor steps denoting the full closed position of the actuator is known within a predetermined tolerance.

10 Claims, 4 Drawing Sheets

AUTOMATIC CALIBRATING ELECTRICALLY CONTROLLED DIAPHRAGM VALVE ACTUATORS AND METHODS FOR THEIR CALIBRATION

FIELD OF THE INVENTION

The present invention relates generally to flow control diaphragm valves, and more particularly, to an apparatus and associated method for automatically calibrating a diaphragm valve actuator which is electrically controlled by a stepper motor and which is utilized to regulate flow through a diaphragm valve.

BACKGROUND OF THE INVENTION

Many processes and devices require precise control over the flow volume of the fluid constituents utilized therein. The operating efficiency of such processes and devices often depends upon the accuracy and dependability of the control over the flow volume. Faulty valve calibration or positioning inaccuracies in the valve actuator caused by wear and tear may result in operational failures, irregular performance, and wasteful energy consumption.

Valve types typically used as flow control valves include cylinoid, piston, gate, globe and diaphragm. Of these types, diaphragm valves with hermetic seals to the flowing fluid have proven to be the preferred choice for applications where leakage cannot be tolerated, because these valves do not experience the leakage problems associated with the other valve types. In operation, diaphragm valves are known to be fairly reliable though their efficiency and accuracy is largely dependent upon the precision and frequency of the valve's calibration. Presently, diaphragm valves are calibrated manually through a repetitive series of minute adjustments, taking up to several hours to complete. Once calibrated, most diaphragm valves are controlled by pneumatic, i.e. air pressure, or electrical means.

Historically, fluid flow control valves were actuated by pneumatic controllers. Such controllers were desirable because they were compatible with the building control systems of that period which also operated with air pressure. Not only were the systems compatible, but the technology was well known by the maintenance personnel. However, with the coming of the computer age, building controls have converted from pneumatic systems to computer systems, and the building controls no longer have available the air to drive pneumatically controlled valves. Additionally, air pressure sensors are generally not as accurate or as precise in signal sensing as are electrical sensors, and consequently are less desirable.

Pneumatically controlled diaphragm valves are typically actuated by a continuously variable signal pressure, for instance, a pressure between 3–15 PSIG (pounds per square inch gauge). The actuator associated with a pneumatically controlled diaphragm valve usually has a mechanical stop attached to the operating stem for defining the minimum closed position. However, this method of defining the minimum closed position does not take into consideration diaphragm thickness, hardness, or machining variances in manufacturing. In operation, pneumatically controlled diaphragm valves have proven to be inaccurate and difficult to control because of hysteresis. Hysteresis is a condition where the diaphragm valve experiences a dead band for a period of time in which the diaphragm does not move subsequent to a change in control pressure.

Simple electric drive motors have also proven to be inaccurate because the amount of movement in a measured voltage pulse is a function of the resisting force in the valve which may vary depending upon whether the valve is working against easy start-up conditions or against full load pressure differentials. As a result, electric drive actuators tend to wander since they do not have means for defining the true valve actuator position.

A more precise and predictable diaphragm valve control means is the electric drive stepper motor. Stepper motors, once integrated into the appropriate linear actuator, are able to move the valve actuator linearly in increments on the order of about 0.00005 inches per motor step, providing precise control over the valve actuator position. However, a problem with the stepper motor vane actuator is determining a full closed position in steps which would not cause damage to the rubber diaphragm when the actuator is commanded to drive the vane closed. With conventional stepper motor valves, the stepper motor drives the valve closed at a given step rate until the valve forces the rubber diaphragm into the far wall of the vane body, and thereby compressing the rubber diaphragm. Once the motor is opposed by a mechanical torque greater than the motor torque and the valve actuator can move no further, the stepper motor stalls. If the stepper motor continues to step off steps, the motor will begin to rotate in the reverse direction until the torque loads are balanced. This anomaly is referred to as "fall back." Consequently, the valve is incapable of determining the actual number of steps to the full closed position and may cause irreparable harm to the rubber diaphragm in attempting to do so.

Calibrating or adjusting the full closed position of either the pneumatically controlled or electrically-controlled diaphragm valve typically requires a repetitive process comprising manual adjustments of the valve to the closed position over a plurality of iterations, while monitoring the other operating parameters until the actual full closed position is properly determined. This process may take in excess of several hours. Calibrating or adjusting the full closed position is important not only to maintain precise predictable control over solution flow during minimum open periods, but also to prevent "compression set" to a diaphragm caused by long term over compression of the valve's diaphragm which results in an inaccurate calibration or loss of calibration. Presently, there is no diaphragm valve control means which can automatically define the actual full closed position of a valve with precision in a short period of time.

The critical nature of valve calibration is evident in the operation of an absorption water chiller. Absorption water chillers, such as the Single Stage Absorption Cold Generator® manufactured by and commercially available from the Trane Company, Wisconsin, U.S.A., circulate a solution of lithium bromide (LiBr) and water. By modulating the flow volume of the LiBr solution in proportion to the load on the absorption unit during low load conditions, less energy is consumed by the absorption unit because less solution reaches the generator, and therefore, less energy is required to heat the solution. For example, the energy consumption of Trane's Single State Absorption Cold Generator® operating at 50% full load is reduced by 7% when the flow volume of the operating solution is proportionally reduced by a diaphragm vane. To achieve this degree of efficiency, the flow control valve must be highly accurate. During unit operation times the absorption unit may operate at as little as 10% full loading, requiring the diaphragm valve actuator to close to a minimum open stop of $\frac{1}{16}"$ or $\frac{1}{8}"$, depending upon the unit model. Consequently, a $\frac{1}{16}"$ error in determining the minimum open stop or the true position of the valve actuator could change the actual flow volume as much as 50% from the desired flow volume. Such inaccuracies in the valve actuator position translate into inaccuracies in the solution flow volume which result in wasteful energy consumption and may potentially result in damage to the absorption unit.

A known, defined minimum open stop valve position is required in absorption water chillers to insure some minimum amount of flow while the absorption water chiller is operating during periods of light loading. This minimum flow prevents the crystallization of the LiBr solution in the absorption water chiller, and thus prevents the solution pump from working against a blocked flow condition. Crystallization occurs when the LiBr solution solidifies, causing the flow to cease. Running the solution pump during blocked flow conditions may result in pump damage and/or nuisance motor safety trips. Consequently, there presently exists a heretofore unaddressed need in the industry for a method to more accurately calibrate diaphragm valves.

SUMMARY OF THE INVENTION

An object of the present invention is to overcome the deficiencies and inadequacies of the prior art as described above and as generally known in the industry.

Another object of the present invention is to provide automatically-calibrating, electrically-controlled, diaphragm vane actuators and methods for their calibration.

Another object of the present invention is to provide a valve actuator and method for efficiently and precisely modulating the flow of fluid passing through a valve.

Another object of the present invention is to provide an electrically-controlled diaphragm valve actuator which is inexpensive to manufacture, which is durable in structure, and which is efficient as well as reliable in operation.

Another object of the present invention is to provide a method for automatically calibrating an electrically-controlled diaphragm valve actuator which can be conducted in a short time period and which is extremely accurate.

Briefly described, the present invention is an electrically-controlled diaphragm valve actuator having a stepper motor controlled by a controller means, such as a central processing unit, microcontroller, microprocessor, or other suitable means. The stepper motor moves the valve actuator so that a diaphragm disposed at one end of the actuator and in communication with the conductive chamber of the valve modulates flow through the conductive chamber. The valve actuator is housed within an outer casting. Mounted to the outer casting is a reference position indicator for generating a signal indicative of when the valve actuator is in a reference position within the actuator's linear stroke. The reference position indicator provides the foregoing signal to the controller means. Moreover, also provided is a means for visually monitoring movement of the valve actuator.

A method for automatically calibrating a diaphragm valve configured in accordance with the present invention comprises the following steps: (a) driving the actuator to a reference position; (b) driving the actuator a first number of steps; (c) returning the actuator to the reference position; (d) determining whether fall back occurred; (e) determining a second number of steps based upon whether fall back occurred; (f) driving the actuator the second number of steps; and (g) repeating steps (c)–(e) until the number of motor steps denoting the full closed position of the actuator is known within a predetermined tolerance.

In addition to accomplishing the objections set forth previously, the present invention has the following additional advantages.

An advantage of the present invention is that it is operable on any size of a molded-open or molded-closed diaphragm valve and on valves from different vendors, even though the diaphragm characteristics or dimensions may vary substantially.

Another advantage of the present invention is that it can be initiated by an operator for new valve assemblies, for new field installations, or merely to compensate for long term "compression set."

Other objects, features, and advantages of the present invention will become apparent to one skilled in the art from the following description when considered in conjunction with the accompanying drawings.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

DETAILED DESCRIPTION OF THE PREFERRED EMBODIMENT

Figure 1:
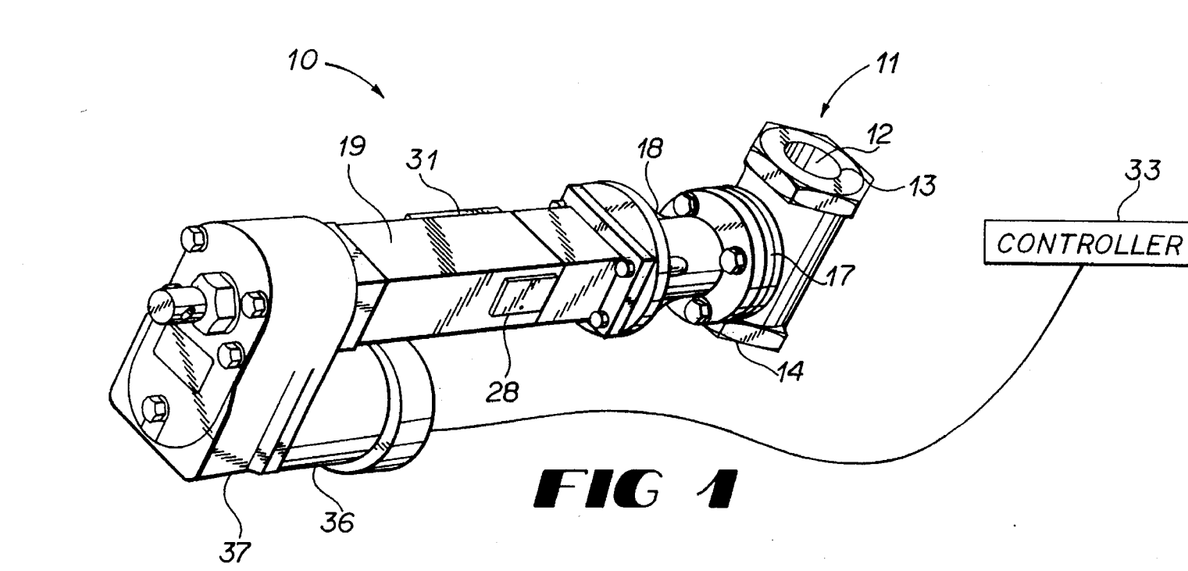
FIG. 1 is a perspective view of an automatically-calibrating electrically-controlled diaphragm valve in accordance with the present invention.

With reference to the drawings wherein like reference numerals represent corresponding parts throughout the several views, FIG. 1 illustrates a perspective view of an automatically-calibrating electrically-controlled diaphragm valve 10 in accordance with the present invention. The automatically-calibrating electrically-controlled diaphragm valve 10 is configured to efficiently and precisely modulate the flow of fluids passing through valve body 11. The automatically-calibrating electrically-controlled diaphragm valve 10 is operable in any number of processes or devices wherein precise control over the flow volume is desirable. Such applications for diaphragm valve 10 include, for example, modulating refrigerant solutions in absorption chiller units, modulating hazardous fluids in chemical or petro-chemical processes, modulating clean fluids in food or pharmaceutical processes, or modulating high/low temperature fluids in processes. Although there are many other applications of the present invention which are not listed, though would be obvious to one of ordinary skill in the art, the present invention is described here in a preferred embodiment adapted for modulating LiBr solution in an absorption water chiller unit.

Figure 2:
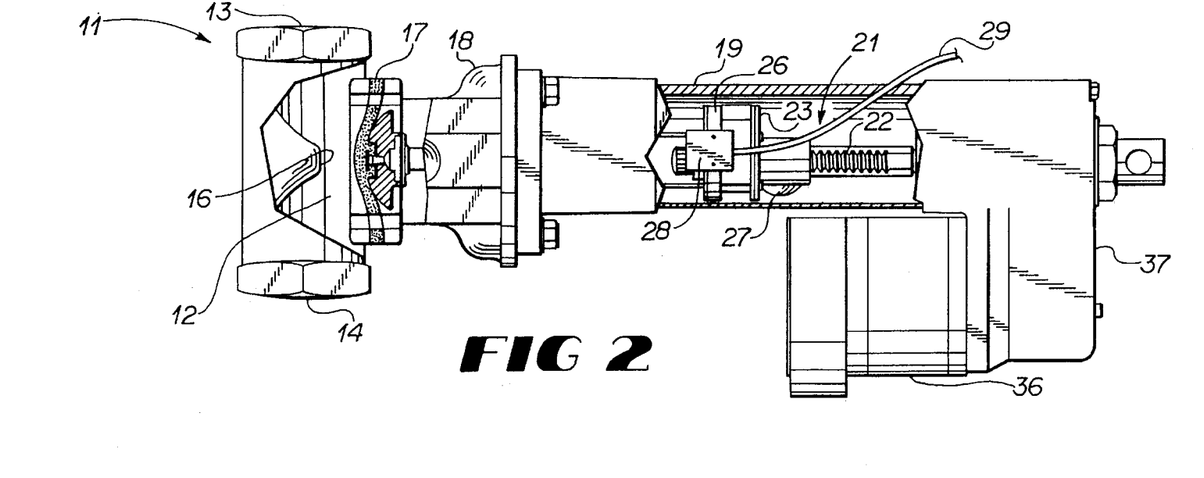
FIG. 2 is a partially cut-away fight side elevational view of the valve of FIG. 1.
Figure 3:
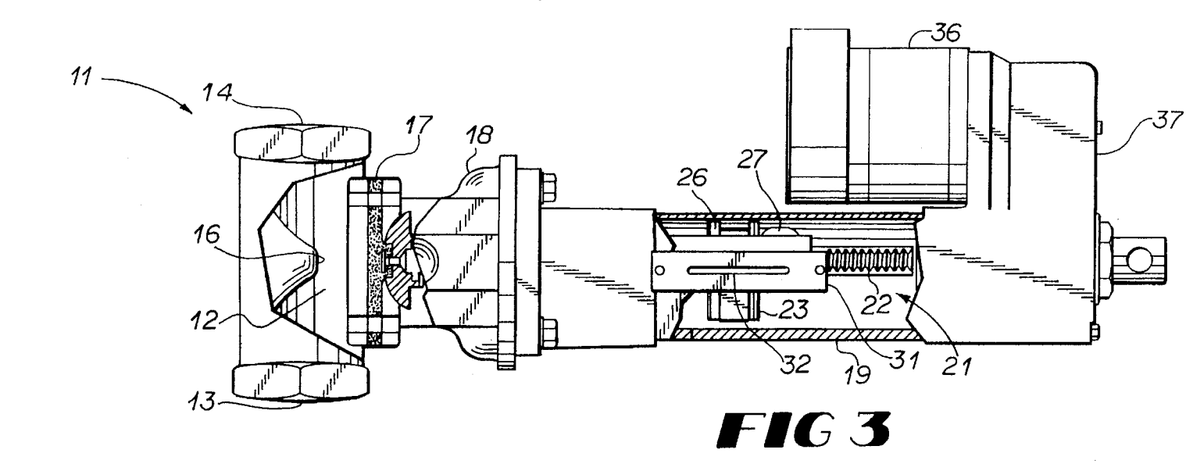
FIG. 3 is a partially cut-away left side elevational view of the valve of FIG. 1.
Figure 4:
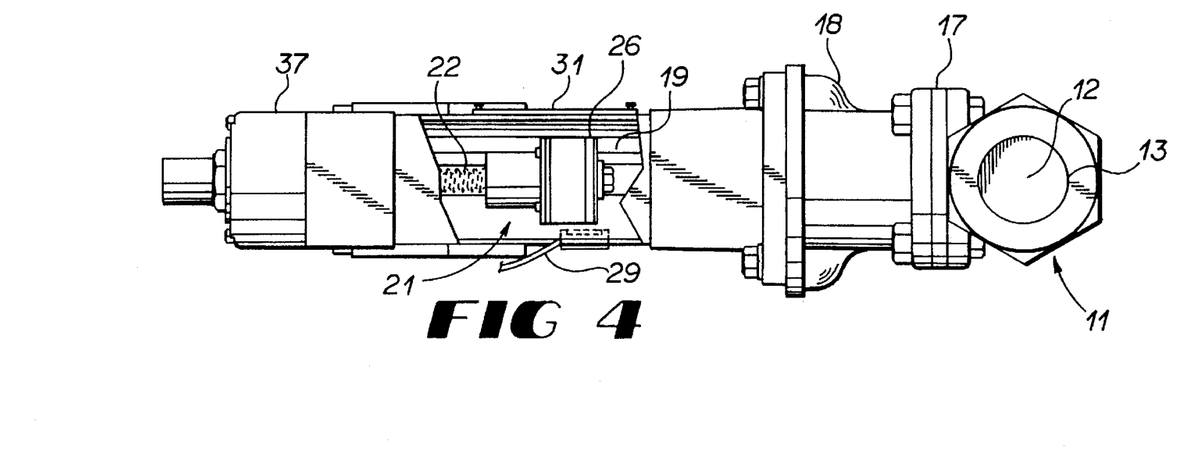
FIG. 4 is a front elevational view of the valve of FIG. 1.

As illustrated in FIGS. 1-4, diaphragm valve 10 comprises a valve body 11 having a conduit 12 therethrough spanning between ports 13 and 14. Within conduit 12 and disposed between ports 13 and 14 is lip 16 forming a ridge, or weir, as best shown in FIGS. 2 and 3. Through an aperture in valve body 11, not shown, molded rubber diaphragm 17 is incrementally urged against lip 16 so as to modulate the LiBr solution flow passing through vane body 11 as it travels from the absorber to the generator of an absorption water chiller. Securing diaphragm 17 to vane body 11 by means such as a screw and bolt arrangement is adapter casting 18. Extending longitudinally from adapter casting 18 is a square outer casing 19 which houses the moving assemblies of an actuator 21. The outer casing 19 is typically a square aluminum tube of a length sufficient to accommodate the linear stroke of the lead screw 22.

As shown in FIGS. 2 and 3, actuator 21 comprises a lead screw 22 and a square plastic slide 23. Square plastic slide 23 comprises a ball screw 27 and a magnet 26. The ball screw 27 connects plastic slide 23 to lead screw 22 so as to convert the rotational movement of lead screw 22 into the linear movement of slide 23. A reference position indicator (RPI) 28 is mounted to outer casting 19 and comprises a magnetic reed switch, which is manufactured by and commercially available from Warner Electric, Inc., U.S.A. A magnet 26 operates in conjunction with reference position indicator (RPI) 28 for determining when actuator 21 is at a known reference position within its stroke. An electric signal is provided through connection 29 when magnet 26 aligns with RPI 28, as shown in FIG. 2, indicating actuator 21 is at the known reference position.

As shown in FIGS. 1 and 3, a visual position indicator 31 is provided so as to allow real time visual indication of the movements of actuator 21 within outer casting 19. The visual position indicator 31 is mounted to outer casting 19 and includes a slit 32 as a viewing port.

Attached to the distal end of outer casting 19 is a stepper drive motor 36 and reduction gear assembly 37, as shown in FIGS. 1-4. The stepper drive motor 36, of the preferred embodiment is a bi-polar, four lead motor connected in parallel and stepped at a maximum rate of 1371 hertz (HZ). Moreover, the gear assembly 37 has a gear ratio of 20:1 with lead screw 22 yielding 0.2 inch/revolution. Finally, the drive motor steps 200 times per revolution, which results in 10,000 steps per one inch of linear travel.

In operation, the controller mechanism 33, shown in FIG. 1, associated with an absorption water chiller unit commands actuator 21 of valve 10 to move a predetermined number of steps so as to provide a specific flow volume of LiBr solution. The stepper motor 36, which is electrically connected to the controller mechanism 33, steps off the predetermined number of steps so as to position the diaphragm at the precise desired position. In order to determine the number of steps necessary to move the actuator 21 the appropriate distance, the controller mechanism 33 is provided with the distance of linear travel for each motor step, for instance, 0.00005 inches per step. Thus, the controller mechanism 33 is programmed to know how many steps are required to drive actuator 21 to a predefined position, such as the minimum open stop. The visual position indicator 31 allows the operator to visually confirm movement of actuator 21.

Actuator 21 can be automatically calibrated to the full closed position upon entering the appropriate command at the unit control panel (UCP) of the absorption water chiller unit instructing controller mechanism 33 to initiate calibration. Once initiated, the complete calibration process only takes about two to five minutes. Once the calibration is complete, the controller mechanism 33 has accurate knowledge of the actual full closed position of actuator 21, and therefore can repeatedly move actuator 21 by a known number of steps to the actual full closed position, to the minimum open stop position, or to any other position with remarkable accuracy. The foregoing feature is extremely important because the absorption water chiller unit can run for several months without stopping, and therefore, the valve position must always have a match between the requested position and the actual position.

Figure 5:
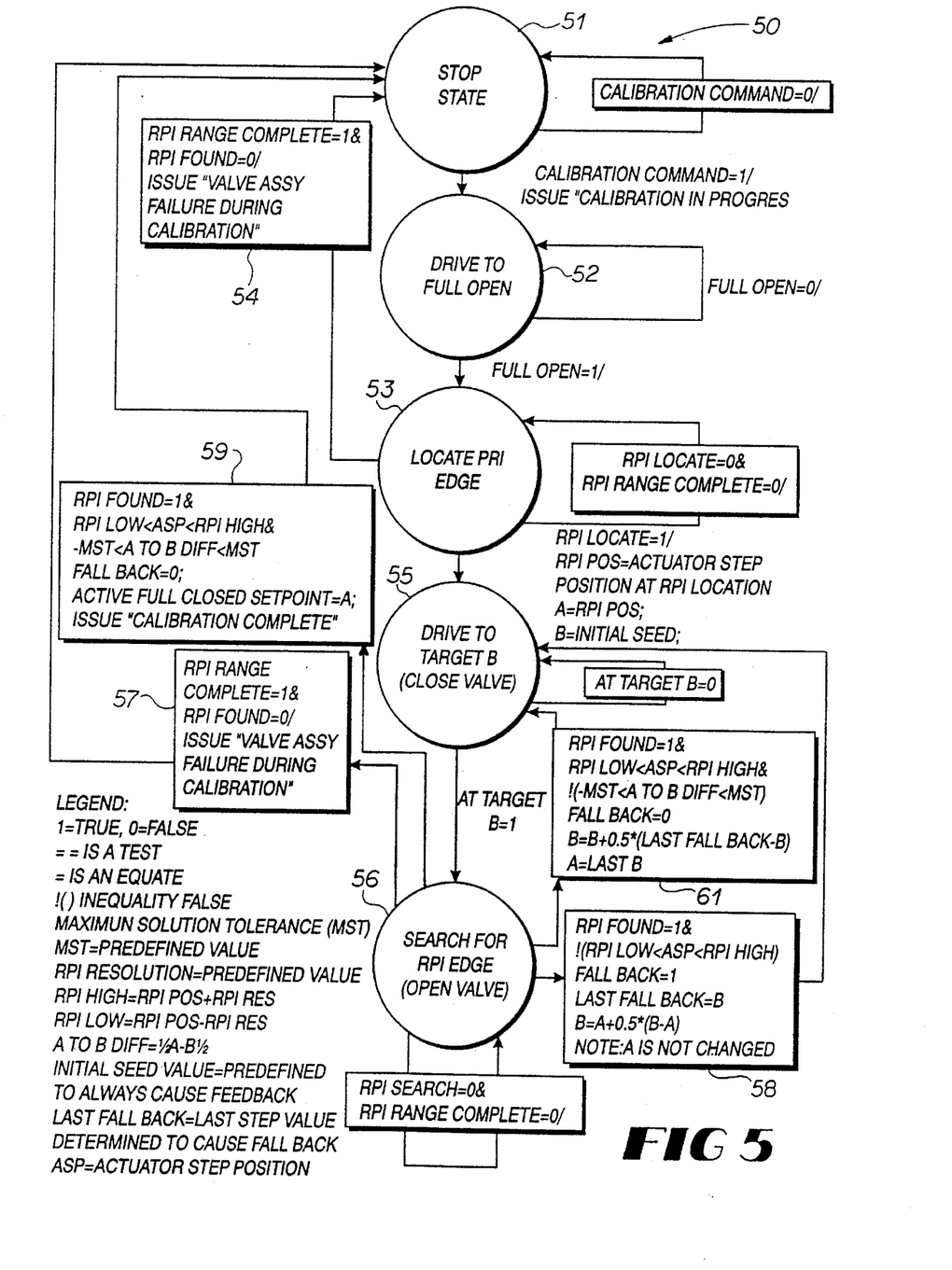
FIG. 5 is a flow chart of a method in accordance with the present invention for automatically calibrating the valve of FIG. 1.

With reference to FIG. 5, a flow chart 50 illustrates the method of automatically calibrating valve 10 in accordance with the present invention. Initially, the valve 10 rests in a stop state, as indicated in flow chart block 51, awaiting the calibration command. Upon receiving the command to calibrate, the UCP indicates "calibration in progress" and drives the actuator 21 of valve 10 to a full opened position, as indicated in flow chart block 52. From the full opened position, actuator 21 is commanded to close until magnet 26 aligns with RPI 28, referred to as locating the RPI edge, as indicated by flow chart block 53. If the RPI edge is not found, then the UCP issues a flag signal "Valve Assy Failure During Calibration," and actuator 21 returns to the stop state, as indicated by block 54. Assuming the RPI edge is found, the number of steps from the full opened position to the RPI position is noted and stored in memory as RPI POS. The same step value is also temporarily stored in memory as variable A. Actuator 21 is then commanded to close valve 10 to a target position denoted in memory as variable B which, for the first iteration is the initial seed value as noted in flow chart block 55. The initial seed value corresponds to a linear distance that will always cause valve 10 to experience fall back.

As actuator 21 approaches the initial seed value, the valve 10 eventually closes completely, thereby preventing actuator 21 from moving any further. However, the stepper motor 36 continues to step off more steps until all the steps to the initial seed value have been taken. Consequently, the step position of the actuator 21 no longer coincides with the actual physical position of actuator 21, indicating fall back has occurred. Following this actuator stroke, actuator 21 is driven open in a RPI search routine until the RPI edge is located, as indicated in flow chart block 56. If the RPI is not found, then the UCP issues a flag signal "Valve Assy Failure During Calibration," and actuator 21 is returned to the stop state, as indicated by flow chart block 57. If the RPI edge is found, then it is determined whether or not fall back occurred by comparing actuator's 21 step position and the known step location of RPI 28, as shown in inequality (1) below:

$$\text{RPI POS} - \text{RPI Res} < \text{actuator step position} < \text{RPI POS} + \text{RPI Res}, \quad (1)$$

where actuator's 21 step position is the actual number of steps taken to the initial seed minus the number of steps taken back to the RPI position. If actuator's 21 step position is not within the predefined resolution of the known RPI position, as will be the case in the first iteration when B is the initial seed value, inequality (1) is false. Therefore, the value of variable A remains unchanged and a new value for variable B is calculated in accordance with equation (2) below as directed in block 58:

$$B = A + 0.5*(B-A), \quad (2)$$

where A=RPI POS and B=initial seed. Note that once the actuator 21 is initially driven to the initial seed, the values of variables A and B are subject to change during each iteration upon the occurrence or non-occurrence of fall back, as illustrated hereafter in greater detail.

Returning to flow chart block 52 as directed by block 58, actuator 21 is once again driven closed from the RPI position a specified number of steps denoted by variable B, as calculated by equation (2) hereinbefore. Following this stroke, actuator 21 is driven open in a RPI search routine until the RPI edge is located, as indicated in flow chart block 56. Inequality equation (1) is then applied given the new actuator step position calculated by subtracting from the number of steps B the number of steps taken backwards to the RPI position. If inequality equation (1) is false, indicating fall back occurred, then A remains unchanged and a new value for B is calculated in accordance with equation (2), and the steps in flow chart blocks 55 and 56 are repeated. However, if inequality equation (1) is true, indicating that fall back did not occur, inequality (3) is applied, as provided below:

$$\text{Maximum tolerance} < A{-}B \text{ difference} < \text{maximum solution tolerance,} \quad (3)$$

where the A–B difference is derived by first subtracting A from B and then taking the absolute value.

If the inequality equation (3) is true, the active full closed setpoint is set by variable A and the UCP generates a signal "calibration complete," as stated in block 59. If inequality equation (3) is false, then the new values for variables A and B are calculated in accordance with the following equations, as indicated in block 61 of FIG. 5.

$$B_{new} = B + 0.5(B_{last\,fall\,back} - B), \text{ and} \quad (4)$$

$$A_{new} = B \quad (5)$$

Returning again to flow chart block 52 as directed by block 61, the actuator 21 is once again driven the number of steps B, calculated above as $B_{new}$. Following this stroke, actuator 21 is driven open in a RPI search routine until the RPI edge is located, as indicated in flow chart block 56. Again, it is first determined whether or not fall back occurred using inequality equation (1). If fall back did occur, then a new value of variable B is calculated while variable A remains unchanged and the steps in flow chart blocks 55 and 56 are repeated. If fall back did not occur, then inequality equation (3) is applied testing the solution tolerance to determine if the active full closed set point has been found within a predefined tolerance. If the tolerance is unacceptable, indicated by inequality equation (3) being false, then new values for B and A are calculated in accordance with equations (4) and (5) respectively, and the steps in flow chart blocks 55 and 56 are repeated. This process is continued until fall back does not occur and the A–B difference is within the predetermined solution tolerance. Thereupon, the active full closed position full closed set point is set as the value of variable A, and the calibration is complete, as indicated in block 59.

Figure 6:
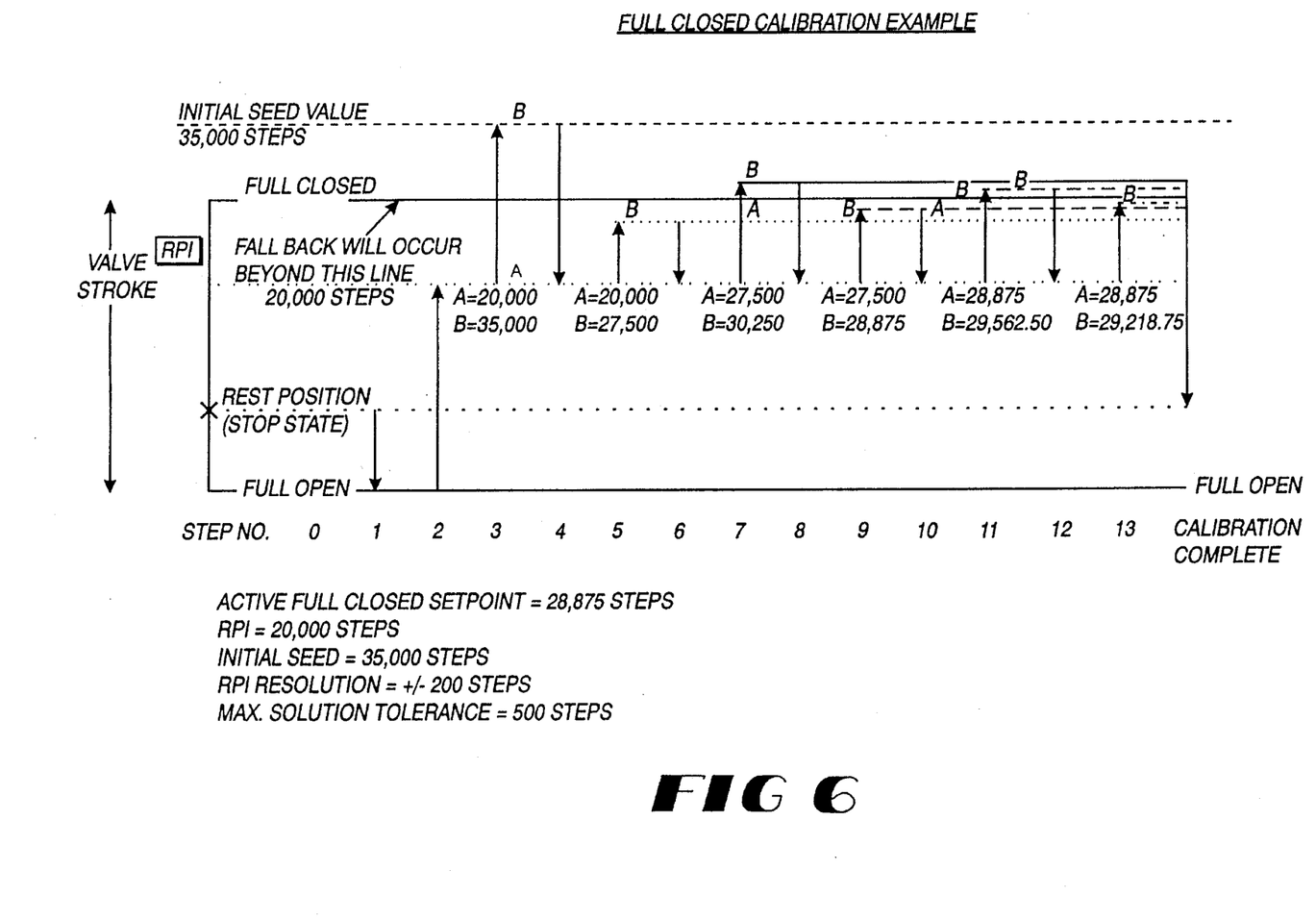
FIG. 6 is a chart illustrating an example of a calibration sequence using the novel method of FIG. 5 on the valve of FIG. 1.

An example of a sequence of steps taken in an actual full closed calibration is provided in FIG. 6. The RPI position is located at 20,000 steps and the initial seed value is preset at 35,000 steps. Beginning with step 1, the valve is driven to the full open position. This position is considered the zero step position from which all steps are counted. Step 2 comprises driving the actuator valve 10 open until the RPI edge is located at 20,000 steps. The value of variable A is then set to 20,000 steps, the RPI position. In step 3, the vane 10 is closed to the initial seed value, 35,000 steps, causing fall back once the vane 10 is fully closed and the actuator can physically move no further. A RPI search routine is then conducted, opening the valve 10 until the RPI edge is found, as noted as step 4. At this point, inequality equation (1) is applied to determine if fall back has occurred, as is always the case when the variable B equals the initial seed value. Consequently, variable A remains the same and a new value for variable B is calculated using equation (2).

The valve 10 is then driven closed to the new value of variable B followed by a RPI search routine and returned to the actuator to the RPI edge, as illustrated by steps 5 and 6, respectively. Once again, inequality equation (1) is used to determine if fall back occurred, which it did not in step 5. Therefore, inequality equation (3) is used to determine if the full closed set point has been determined within the predefined solution resolution of 500 motor steps, which it has not. Consequently, a new value for variable B is calculated in accordance with equation (4) and a new value for variable A in accordance with equation (5). This process is repeated in steps 7–13 of FIG. 6 until the valve actuator 11 is driven B steps without causing fall back and where B is within the predefined solution tolerance of A. In the present example, this occurs in step 13. Thus, the calibration is complete and the active full closed set point is set at the value of variable A, or in other words, 28,875 steps. The actuator 11 is then driven back to the rest position as shown.

It will be obvious to those skilled in the art that many modifications and variations may be made to the preferred embodiment described above without departing from the novel teachings of the present invention. All such modifications and variations are intended to be incorporated herein and within the scope of the present invention, as set forth in following claims.

Wherefore, the following is claimed:

1. A method for automatically calibrating an electrically-controlled diaphragm valve having an electrically driven actuator and reference position indicator within said valve for indicating a position of said actuator within said valve, comprising the steps of:

(a) driving said actuator to the reference position indicator;

(b) driving said actuator a first number of steps;

(c) returning said actuator to the reference position indicator;

(d) determining whether fall back occurred in step (b), and determining a second number of steps based upon whether fall back occurred; and (e) driving said actuator the second number of steps in order to eliminate error caused by said fall back.

2. The method of claim 1, further comprising the steps of:

repeating steps (c) through (e) until a third number of steps denoting a full closed position of said actuator is known within a predetermined tolerance; and operating said diaphragm valve based upon said third number of steps denoting a full closed position of said actuator.

3. A method for automatically calibrating an electronically controlled diaphragm valve actuator having an actuator electrically driven by a stepper motor and a reference position indicator for indicating a reference position of said actuator, said method comprising the steps of:

(a) placing said actuator at the reference position indicated by said reference position indicator;

(b) driving said actuator a first number of steps;

(c) returning said actuator to the reference position indicated by said reference position indicator;

(d) determining if fall back occurred by determining whether said first number of steps exceeded the number of steps necessary to close said valve;

(e) determining a second number of steps greater than said first number of steps if fall back did not occur; and (f) determining a second number of steps, which is less than said first number of steps, if fail back did occur.

4. The method of claim 3, further comprising the step of repeating steps (b) through (f) using said second number of steps as a next first number of steps for each subsequent iteration until a closed position of said actuator is known within a predetermined tolerance.

5. The method of claim 3, wherein step (d) comprises the step of determining if the number of steps taken to return said actuator to said reference position indicator is within a predetermined tolerance of said first number of steps.

6. The method of claim 3, wherein step (e) comprises the step of determining said second number of steps by increasing said first number of steps by a factor of one-half of a difference between said first number of steps of a last iteration in which fall back occurred and said first number of steps.

7. The method of claim 3, wherein step (f) comprises the step of determining said second number of steps by increasing said first number of steps of a last iteration in which fall back did not occur by a factor of one-half of a difference between said first number of steps and said first number of steps of said last iteration in which fall back did not occur.

8. The method of claim 4, wherein determining said closed position of said actuator comprises the step of determining if a difference between a last said first number of steps determined not to produce fall back is within a predetermined tolerance of a previous said first number of steps determined not to produce fall back.

9. A method for automatically calibrating an electronically-controlled linear actuator valve assembly, comprising the steps of:

(a) providing a molded diaphragm valve having an electronic stepper actuator and a reference position indicator;

(b) driving said valve to a full open position;

(c) driving said actuator to said reference position indicator;

(d) calculating a tolerance range based upon the reference position indicator position and a first predetermined tolerance;

(e) driving said actuator a predetermined number of steps to a target position, thereby closing said valve;

(f) returning said actuator to said reference position indicator;

(g) determining if the number of steps to said target position minus the number of steps back to said reference position indicator is within said tolerance range, thereby indicating if fall back occurred;

(h) decreasing the number of steps to a first new target position if fall back did not occur;

(i) increasing the number of steps to a second new target position if fall back did occur;

(j) driving said actuator the number of steps to one of said new target positions; and (k) returning said actuator to said reference position indicator.

10. The method of claim 9, further comprising the steps of repeating steps (g) through (k) until fall back does not occur and a difference between the number of steps to successive target positions not causing fall back is within a second predetermined tolerance.

\* \* \* \* \*

UNITED STATES PATENT AND TRADEMARK OFFICE
CERTIFICATE OF CORRECTION

PATENT NO. : 5,518,015
DATED : May 21, 1996
INVENTOR(S) : Berget et al.

It is certified that error appears in the above-indentified patent and that said Letters Patent is hereby corrected as shown below:

Column 9, line 7, replace "fail" with --fall--.

Signed and Sealed this

Sixth Day of August, 1996

Attest:

BRUCE LEHMAN

Attesting Officer

Commissioner of Patents and Trademarks